United States Patent [19]

Shira et al.

[11] 3,886,969
[45] June 3, 1975

[54] TIME DELAY VENT VALVE

[75] Inventors: Michael L. Shira, Castro Valley;
Robert H. Henderson, Livermore,
both of Calif.

[73] Assignee: **The United States of America as
represented by the United States
Energy Research and Development
Administration,** Washington, D.C.

[22] Filed: May 23, 1973

[21] Appl. No.: 365,299

[52] U.S. Cl. ............................... 137/509; 137/510
[51] Int. Cl. ........................................... F16k 31/12
[58] Field of Search ............... 137/509, 510; 138/42

[56] References Cited
UNITED STATES PATENTS

| | | | |
|---|---|---|---|
| 1,186,780 | 6/1916 | Hennebohle | 137/509 X |
| 2,635,574 | 4/1953 | Sturtevant | 137/510 X |
| 2,748,797 | 6/1956 | Heizer | 137/510 |
| 3,236,261 | 2/1966 | Morgan | 137/510 X |
| 3,677,300 | 7/1972 | King | 138/42 |
| 3,783,848 | 1/1974 | Ranft | 137/510 X |

*Primary Examiner*—Harold W. Weakley
*Attorney, Agent, or Firm*—John A. Horan; F. A. Robertson; L. E. Carnahan

[57] ABSTRACT

A self-actuated valve that functions after a predetermined time delay. The valve can be used to determine the time a fluid is at a point of use or to control the flow of fluid to or from a point of use. The valve can be self resetting. Basically, the valve assembly consists of a spool-shaped piston positioned in a chamber of a housing having a continuously interconnected inlet, an optional outlet, and an exhaust port. The larger end of the spool-shaped piston is acted upon by the pressure within an accumulator volume and the small end of the piston forms a seal, thereby normally closing the exhaust port from the inlet. The piston is provided with a flow restrictive means that communicates the inlet with the accumulator. The accumulator can be provided with an optional venting valve. The time delay vent valve works in the following manner. Fluid flows into or through the valve housing and passes through the piston's flow restrictive means into the accumulator. Since the accumulator end of the piston has a larger area than the inlet end, the total force on the accumulator end of the piston will exceed the total force on the inlet end after a period of time. The force differential moves the piston, which opens the seal, and allows the fluid to flow from the inlet through the exhaust port. The time delay is readily changed by simply changing the flow restrictive means in the piston. The valve can be self-resetting or can be externally reset by several techniques.

12 Claims, 7 Drawing Figures

3,886,969

TIME DELAY VENT VALVE

BACKGROUND OF THE INVENTION

The invention described herein was made in the course of, or under, Contract No. W-7405-ENG-48 with the United States Atomic Energy Commission.

This invention relates to valves, particularly to valves of the type operable under the force of the supply fluid being controlled, and more particularly, to a valve which controls the presence or flow of fluid by venting the fluid after a predetermined time delay.

Much prior effort and many types of valves have been developed which utilize the force of supply fluid under pressure for operating the valve responsive to a control signal. Such a prior art valve is exemplified by U.S. Pat. No. 3,519,022 issued July 7, 1970 to K. Chung et al. However, like other prior art efforts the valve of this patent is controlled by an external signal and thus is not self-actuated in response to fluid flow therethrough. Thus, a need exists in the prior art for a valve capable of controlling the fluid presence or flow to or from a point of use responsive to the time duration of the fluid presence or flow.

SUMMARY OF THE INVENTION

The present invention fulfills the need existing in the prior art for a self-controlled valve capable of controlling fluid therethrough as the result of the time duration of the presence or flow of the fluid. This is accomplished by providing a valve for controlling fluid at a point or use, or by flowing fluid to or from a point of use by venting the fluid after a predetermined time delay due to a flow-restrictive means which controls an actuator pressure in correspondence with a predetermined time delay. Thus, the valve described herein provides an effective, yet simple means of controlling the fluid at a point of use or by controlling the flow of fluid to or from a point of use and release therefrom after a predetermined time delay.

Therefore, it is an object of this invention to provide a time delay vent valve.

A further object of the invention is to provide a fluid actuated, self-contained, time delay valve.

Another object of the invention is to provide a valve capable of regulating the time a fluid is at a point of use by venting part or all of the fluid after a predetermined time delay.

Another object of the invention is to provide a valve capable of controlling the flow of fluid to a point of use and to vent part or all of the fluid after a predetermined time delay.

Another object of the invention is to provide a fluid actuated, self-contained means for producing a time delay in the flow of fluid through a fluid passage.

Another object of the invention is to provide a valve for directing the flow of fluid to a point of use for a desired time period.

Another object of the invention is to provide a self-contained, fluid actuated valve for metering the amount of fluid flow to a point of use.

Other objects of the invention will become readily apparent from the following description and accompanying drawings.

DESCRIPTION OF THE INVENTION

This invention is a valve for controlling the time a fluid is at a point of use, or for controlling the flow of fluid to or from a point of use and then venting the fluid after a predetermined time delay. As pointed out above, many applications exist for a self-contained valve wherein a fluid (either gas or liquid) is needed at a point of use for a desired time after which removal of the fluid therefrom is required. For example, a supply of gas to an ignition means is needed wherein should ignition not take place for a period of time the gas is vented therefrom in response to a pressure differential across the valve as established by passage of a portion of the flowing gas through a flow restrictive means within the valve, whereby the ignition means is returned to a safe condition. Also, applications exist wherein a fluid under pressure is required, such as against a ram, for a period of time, whereafter the fluid need be withdrawn, the valve of this invention providing such a fluid control.

Figure 1A:
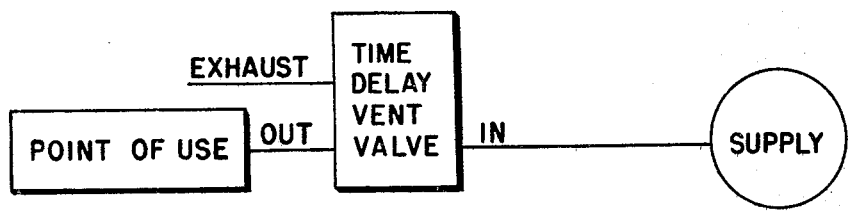
FIGS. 1a – 1d illustrate applications for the inventive fluid actuated, self-contained, time delay valve.
Figure 1B:
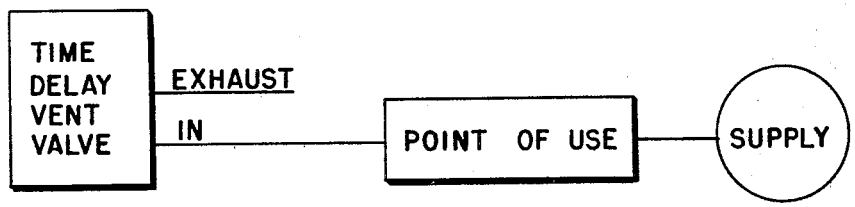
Figure 1C:
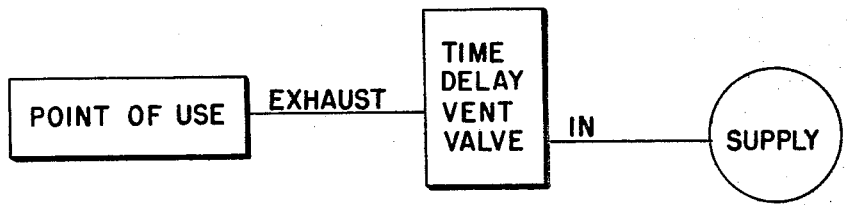
Figure 1D:
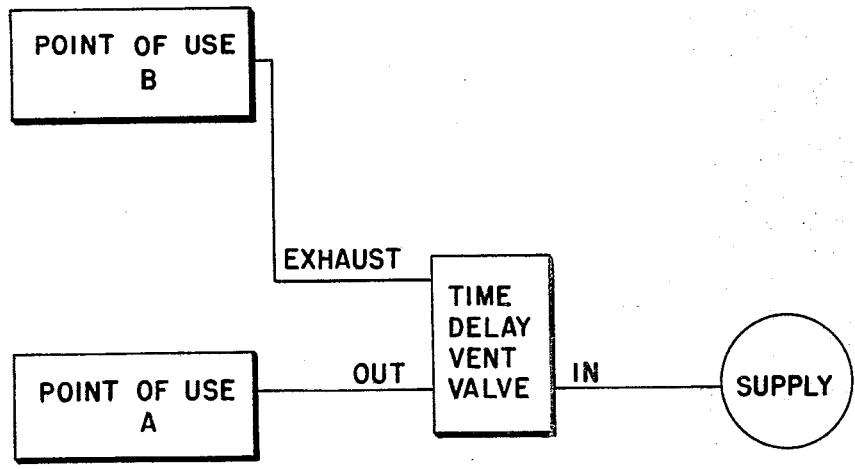
Figure 3:
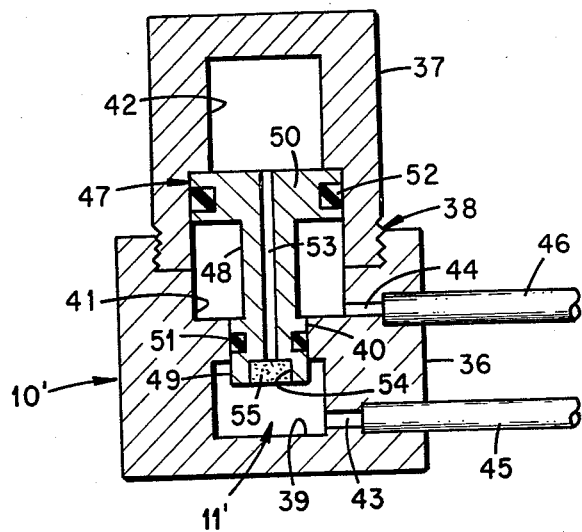
FIG. 3 is a view, partially in cross-section of another, more simplified, embodiment of the invention.
Figure 4:
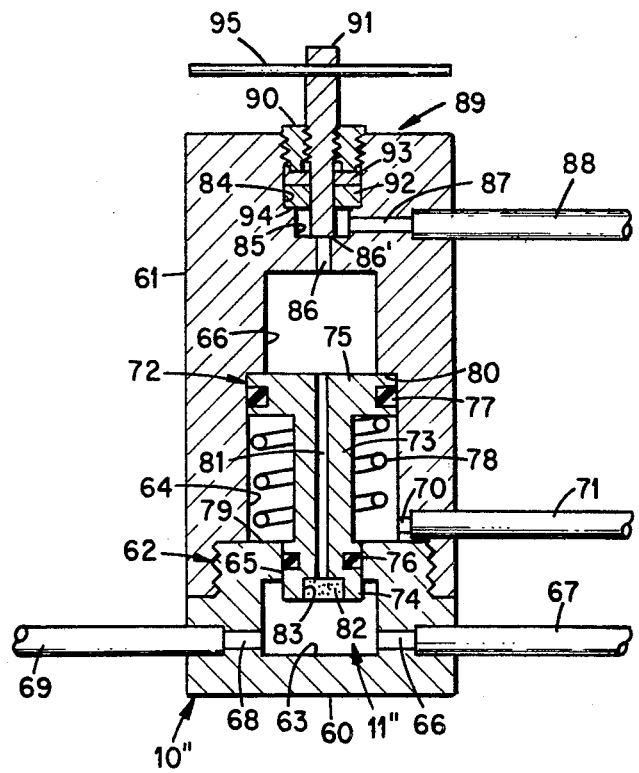
FIG. 4 is a partial cross-sectional view of a third embodiment of the invention incorporating an accumulator vent arrangement.

Referring now to the drawings, FIGS. 1a – 1d illustrate various applications for the hereinafter described embodiments of the time delay valve. FIGS. 1a, 1b and 1d illustrate applications of the valve to regulate the time a fluid is at a point of use by venting part or all of the fluid after a predetermined time delay, with FIGS. 1a and 1d utilizing either the FIG. 2 or FIG. 4 embodiment, while FIG. 1b utilizes the FIG. 3 embodiment. In addition, FIGS. 1a and 1d illustrate applications to control the flow of fluid to a point of use and then vent part or all of the fluid after a predetermined time delay. FIG. 1c illustrates an application of the valve to provide a time delay in the flow of fluid through a line, tube, or other fluid passage, and utilizes the FIG. 3 embodiment. FIGS. 1a, 1c and 1d illustrate applications to meter or control the amount of fluid flow to a point of use, while FIG. 1d illustrates the exhaust fluid from point of use A flowing to point of use B. FIG. 1b illustrates an application to control the flow of fluid from a point of use by venting part or all of the fluid after a predetermined time delay. The above applications, illustrated in FIGS. 1a – 1d, for the time delay valve of FIGS. 2–4 are exemplary and it is not intended to limit the valve to these applications.

Figure 2:
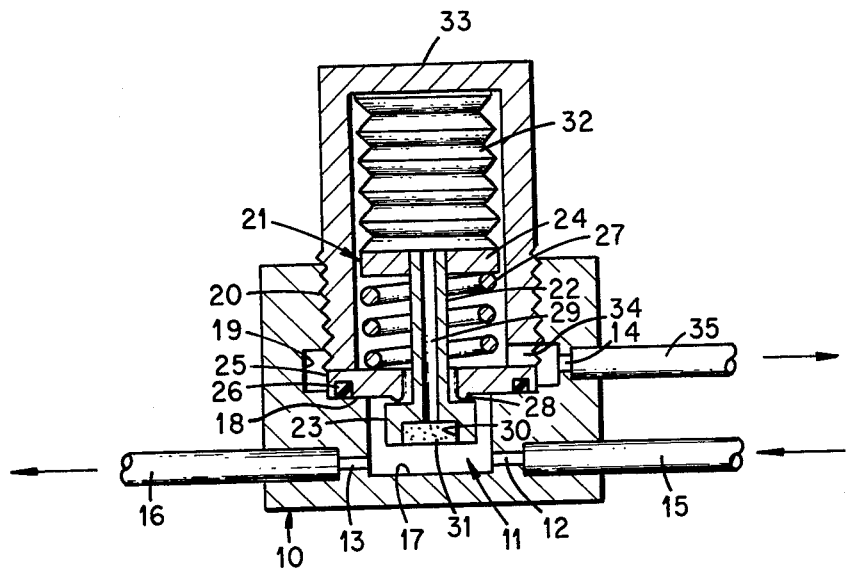
FIG. 2 is a partial cross-sectional illustration of a preferred embodiment of the invention.

Referring now to FIG. 2, the preferred embodiment of the valve comprises a body member or housing 10 defining a chamber therein generally indicated at 11, and having an inlet passage 12 and outlet passage 13 in fluid communication with a lower portion of chamber 11, and an exhaust passage or port 14 in fluid communication with a central portion of said chamber. An inlet conduit or tube 15, adapted to be connected to a fluid supply, is connected to passage 12 while an outlet conduit or tube 16 is connected to outlet passage 13, conduit 16 being connected to a point of use. Housing 10 is internally configured such that chamber 11 is composed of a lower section 17 in open communication with passages 12 and 13, an adjacent larger diameter section defining a shoulder 18, a still larger diameter section 19 in open communication with exhaust port 14, and an upper threaded section 20 of a diameter less than section 19. A spool-shaped piston or plunger 21 is positioned in chamber 11, piston 21 having a central shank 22 and end flanges or lands 23 and 24, the lower flange or land 23 being of a cross-sectional area less than that of the upper land or flange 24 thereof, lower land 23 being of a cross-section less than the diameter of the lower section 17 of chamber 11. An exhaust seat disk 25 is positioned on shoulder 18 and is provided with a groove containing an o-ring seal 26 preventing leakage of fluid thereby. Disk 25 is provided with a central aperture through which the shank 22 of piston 21 extends, a spring or resilient member 27 being located about shank 22 and intermediate disk 25 and upper land 24 of piston 21 and normally functioning to retain the land 23 against the seat 28 of disk 25, thereby closing fluid communication between lower section 17 of chamber 11 and exhaust port 14. Piston 21 is provided with a passage or channel 29 extending longitudinally therethrough, channel 29 being provided with an enlarged section 30 in lower land 23 within which is positioned a flow restrictive member 31, such as a porous sintered plug as shown, a capillary tube or orifice, which allows a predetermined amount of fluid therethrough during a specified time period. An accumulator member, such as a bellows 32, is positioned in abuttment with upper land 24 of piston 21 and in fluid communication with channel 29, bellows 32 is retained against land 24 by a cap, cover, or housing member 33 which is threadedly secured in threaded section 20 of housing 10. Housing member 33 extends into chamber 11 and abuts against exhaust seat disk 25 retaining same against shoulder 18 of housing 10, housing body or member 33 being provided with a plurality of apertures 34 (only one shown) to provide fluid communication between the interior thereof and section 19 of chamber 11 and exhaust port 14.

In operation, fluid (either gas or liquid) from a pressure source (see FIGS. 1a or 1d) enters inlet 12, chamber section 17 and passes out through outlet 13 to a point of use, while at the same time passing through the flow restriction member 31, which functions as a fluid flow time delay, channel 29 into pressure accumulator 32. Due to the upper land 24 adjacent accumulator 32 being of a cross-section larger than that of land 23, as the pressure builds up in the accumulator it thus bears against a larger effective area than the fluid pressure in the chamber section 17 bearing against land 23. Consequently, even though the accumulator pressure is always lower than the inlet (chamber section 17) pressure (due to pressure drop across the flow restrictor 31), the total force on the accumulator end of piston 21 (land 24) will exceed the total force on the land 23 and spring 27, driving the piston downward, moving land 23 away from seat 28, whereby the fluid will exhaust via the aperture in disk 25, apertures 34 in housing member 33, chamber section 19, exhaust port 14 and out through an exhaust conduit or tube 35, such that the fluid is exhausted from its point of use as well as any inlet fluid continuing to flow.

After the above-described sequence is completed and the pressure in section 17 of chamber 11 has been reduced, the fluid at greater pressure in accumulator 32 will reverse its flow out of passage 29, through flow restriction 31, into chamber section 17 and out passage 12 or passage 13. The spring 22 and bellows 32 will then reset the piston 21 to its initial sealed position.

It is thus seen that the valve time delay is a function of the piston 21 area ratio, accumulator 32 volume, and the restrictor 31 flow coefficient. With these parameters known, the time delay can be readily determined for any given time profile of input pressure. One way of effectively selectively changing the delay time of the valve is to utilize a series of interchangeable sintered metal, or other material, plugs with increasing flow resistance as the flow restriction 31. The valve delay time can then be changed simply by inserting the proper sintered plug in the flow restrictor channel.

FIG. 3 illustrates the most simplified embodiment of the time delay vent valve. The fundamental operation of this embodiment is the same as that of the preferred embodiment of FIG. 2. The significant structural differences being: (1) the poppet seal is replaced with an o-ring seal, (2) the bellows is replaced with an o-ring seal, (3) the spring is omitted, and (4) the outlet conduit is omitted. Similar components to those of FIG. 2 will be given corresponding reference numerals.

As illustrated the time delay vent valve of FIG. 3 comprises a body member or housing indicated generally at 10' defining a chamber therein generally indicated at 11', housing 10' consisting of two sections 36 and 37 interconnected by mating threaded portions indicated generally at 38. The interior of housing 10' is configured such that chamber 11' comprises a first diameter section 39, a second smaller diameter section 40, a third section 41 having a diameter larger than section 39, and a fourth section 42 of a diameter approximately that of section 39. Housing section 36 is provided with a fluid inlet passage 43 in communication with chamber section 39 and a fluid exhaust passage or port 44 in communication with chamber section 41, conduits or tubes 45 and 46, respectively, are connected with passages 43 and 44. A spool-shaped piston-like member or plunger generally indicated at 47 consisting of a central shank 48, and lands 49 and 50 is positioned within chamber 11'. The lands 49 and 50 are of a diameter slightly less than the diameter of chamber sections 40 and 41 and are positioned so as to be movable within these respective chamber sections. Lands 49 and 50 are each provided with grooves within which are secured o-ring seals 51 and 52, respectively, which cooperate with the adjacent interior surfaces of housing 10' defining chamber sections 40 and 41 to prevent leakage of fluid therebetween. The housing wall surface defining chamber section 40 functions as a valve seat for land 49 of the piston 47 thereby providing a seal therebetween. Shank 48 of piston 47 is provided with a longitudinally extending passageway 53 providing fluid communication between chamber sections 39 and 42, section 42 functioning as an accumulator similar to bellows 32 of the FIG. 2 embodiment. Land 49 of piston 47 is provided with a countersink portion 54 within which a flow restrictive member 55 is positioned, member 55 being similar to member 31 of FIG. 2.

In operation of the FIG. 3 embodiment, fluid under pressure either from a pressure source (see FIG. 1c) or a point of use (see FIG. 1b) communicates with chamber section 39 via inlet conduit 45 and inlet passage 43. With piston 47 positioned as shown, fluid passage from chamber section 39 to chamber section 41 and exhaust passage 44 is prevented by the piston land 49 being positioned within chamber section 40. Fluid passes through restrictive member 55 at a controlled rate depending on the material thereof and passes through passageway 53 in piston shank 48 into chamber section or pressure accumulator 42. As in the FIG. 2 embodiment, since the piston land 50 in fluid communication with accumulator 42 is of a larger cross-sectional area than the area of piston land 49 in communication with fluid in chamber section 39, the total downward force of the accumulator on piston land 50 will exceed the total upward force on piston land 49 after a period of time. This force differential moves the piston 47 downward moving piston land fully into chamber section, which opens the seal between chamber sections 39 and 41, and allows the fluid to flow from inlet 43 through exhaust port 44. As in the FIG. 2 embodiment, the time delay is readily changed by simply changing the flow restrictive member 55.

The FIG. 3 embodiment differs from that of FIG. 2 in the resetting of the piston in that it is not self-resetting and reset is accomplished by disassembling the valve and reassembling with the piston positioned as shown.

The FIG. 4 embodiment differs from that shown in FIG. 2 essentially by two features, although the fundamental operation of the valve is the same, the differences primarily being: (1) the poppet seal and bellows are replaced with o-ring seals, and (2) the addition of a vent valve in the accumulator which allows same to be selectively vented. Like the FIG. 2 embodiment, this embodiment is self-resetting by the spring-biased piston arrangement.

Referring now to FIG. 4, this embodiment comprises a housing or body member indicated generally at 10″ defining an interior chamber generally indicated at 11″, housing 10″ consisting of sections 60 and 61 interconnected by cooperating threaded portions thereof indicated generally at 62. Chamber 11″ is composed of a first or lower section 63, a second and larger diameter section 64 connected to section 63 by a third and smaller diameter section 65, and a fourth section 66 of a diameter about that of section 63 adjoins section 64. A fluid inlet passage 66 in housing section 60 interconnects an inlet line or conduit 67 with lower chamber section 63, while chamber section 63 is connected via an outlet passage 68 to an outlet tube or conduit 69. For example, inlet and outlet conduits 67 and 69 may be connected respectively to a supply or source of pressure fluid and to a point of use as illustrated in FIGS. 1a and 1d. An exhaust port or passage 70 in housing section 61 interconnects chamber section 64 with an exhaust pipe or conduit 71, which may, for example, be connected as illustrated in FIG. 1d to a second point of use. A spool-like piston or member generally indicated at 72 comprising a central shank 73 and end lands 74 and 75 is positioned in chamber 11″ such that land 74 is positioned within chamber section 65 and extends into chamber section 63, while land 75 is positioned to move within chamber section 64. Lands 74 and 75 each contain a groove within which is positioned o-ring seals 76 and 77, respectively, adapted to cooperate with the interior surfaces of housing 10″ defining chamber sections 65 and 64. A spring 78 is positioned around shank 73 of piston 72 and between land 75 of the piston and an upper surface 79 of housing section 60 so as to normally bias piston 72 upward to abut against a shoulder 80 in housing section 61 and normally maintain land 74 within chamber section 65 thereby preventing passage of fluid from chamber section 63 to chamber section 64. As in the embodiment of FIG. 3, a fluid passage 81 extends longitudinally through piston 72 to allow fluid to flow from chamber section 63 into chamber section 66 which functions as a pressure accumulator functionally equivalent to the bellows 32 of the FIG. 2 embodiment. The amount of fluid passed through passage 81 into accumulator 66 in a time period is determined by a flow restrictor, such as a porous sintered plug 82, positioned in an enlarged lower end portion 83 of passage 81. The restrictor 82 may also be a capillary tube or a restrictive orifice, for example. Housing section 61 is provided at the upper end thereof with a cavity having a first portion indicated at 84 having a threaded upper end, and a second portion 85 of smaller diameter and connected to chamber section or accumulator 66 via a passage 86. Cavity portion 85 is connected via a vent passage or port 87 to a vent tube or conduit 88. A vent valve assembly generally indicated at 89 is positioned in the cavity and is secured to housing section by a nut 90 having threads thereon which cooperate with those of cavity portion 84. Vent valve assembly 89 additionally includes a stem needle-like valve member 91 adjustably mounted in nut 90 and extending through cavity portion 85 with the upper end of passage 86 forming a seat 86′ therefor. To prevent leakage, a seal or packing 92 and washer 93 are positioned in cavity portion 84 beneath nut 90 and abutting against a shoulder 94 of housing section 61. As shown the vent valve assembly is closed, and to open same, to vent the accumulator 66 via passage 86, vent port 87 and tube 88, a handle 95 attached to valve member 91 is rotated thereby raising the point thereof from passage 86 allowing fluid to vent from accumulator 66. The accumulator vent valve assembly 89 may be actuated by an external signal as well as manual and thus instant resetting of the piston 72 is possible, as well as proportional and digital fluid control applications.

Operation of the FIG. 4 time delay valve embodiment is believed obviously from the foregoing description and the previously described operation of the embodiments of FIGS. 2 and 3.

It is thus seen that this invention provides a self-contained, time delay vent valve which requires no external control or signal to terminate the flow of fluid to or from a point of use. The valve functions to vent the fluid as a result of the fluid flow via a flow restrictive means functioning as a time delay, thereby advancing the state of the art. In addition, embodiments of the valve are self-resetting.

While particular embodiments of the invention have been illustrated and described, modifications will become apparent to those skilled in the art, and it is intended to cover in the appended claims all such modifications as come within the spirit and scope of the invention.

What we claim is:

1. A time delay valve comprising: a housing defining a chamber therein, said housing comprising a first body portion and a second body portion interconnected by mating threaded sections of said first and second body portions, a piston-like member positioned in said chamber and having spaced end portions interconnected by a shank portion having a cross-sectional area smaller than said end portions, one of said end portions having a larger cross-sectional area than the other end portion, said housing being provided with a fluid inlet in open communication with a lower portion of said chamber, and with an exhaust port in communication with a central portion of said chamber, said central portion of said chamber having a cross-section greater than the cross-section of said lower portion of said chamber, means intermediate said lower portion and said central portion of said chamber defining a valve seat, said other end portion of said piston-like member being positioned to cooperate with said valve seat defining means such that a fluid seal is provided therebetween preventing fluid flow between said lower portion and said central portion of said chamber, means located in an upper portion of said chamber having a cross-section less than said central portion of said chamber and defining a pressure accumulator in fluid communication with said one end portion of said piston-like member, said lower, central, and upper portions of said chamber being in axial alignment with one another, said piston-like member being provided with a channel extending therethrough providing fluid communication between said lower portion of said chamber and said pressure accumulator means, and means forming a fluid flow restrictor and functioning as a time delay positioned in said channel, said fluid flow restriction forming means comprising a porous member positioned in an enlarged section of said channel such that a portion of the fluid flowing from said inlet into said lower portion of said chamber passes through said porous member into said pressure accumulator means thereby acting on the larger cross-sectional area of said one end portion of said piston-like member forcing said other end portion thereof away from said valve seat defining means and allowing fluid to pass from said lower portion to said central portion of said chamber and exhaust through said exhaust port.

2. The valve defined in claim 1, wherein said housing is internally configured such that said chamber comprises a first section defining said lower portion and having a first cross-section, a second section having a cross-section larger than said first section defining said central portion and connected to said first section through a third section having a cross-section different from the cross-section of said first and second sections, and a fourth section adjacent said second section defining said upper portion having a cross-section less than the cross-section of said second section, said fluid inlet being connected to said first section of said chamber, and said exhaust port being connected to said second section of said chamber.

3. The valve defined in claim 1, additionally including means operatively positioned in said second body portion of said housing for selectively venting said pressure accumulator means, and wherein said first body portion of said housing is provided with a fluid outlet in open communication with said lower portion of said chamber.

4. The valve defined in claim 1, additionally including resilient means located in said chamber and positioned to apply a biasing force against said piston-like member to normally maintain said fluid seal between said valve seat defining means and said other end portion of said piston-like member, said biasing force being overcome by fluid pressure in said accumulator means acting against said one end portion of said piston-like member.

5. The valve defined in claim 1, additionally including means for selectively venting said pressure accumulator means, said venting means being operatively mounted in a cavity in said housing, said cavity being in fluid communication with said pressure accumulator means and with the housing exterior, said venting means including a movable stem-like member positioned to initiate and terminate fluid communication between said pressure accumulator means and said housing exterior.

6. The valve defined in claim 1, wherein said housing includes an internally configured portion intermediate said lower chamber portion and said central chamber portion comprising said valve seat defining means, and wherein said piston-like member is provided with a groove in said other end portion containing an o-ring which cooperates with said valve seat defining means to create said fluid seal.

7. The valve defined in claim 1, wherein said chamber includes an upper portion of a cross-section less than said central portion, wherein said one end portion of said piston-like member is provided with a peripherally located o-ring cooperating with an interior surface of said housing defining said central chamber portion and preventing fluid passage from said upper portion of said chamber, said upper portion of said chamber defining said pressure accumulator means.

8. The valve defined in claim 1, wherein said porous member comprises a sintered metal plug.

9. The valve defined in claim 1, wherein said first body portion of said housing is internally configured such that said chamber comprises a first section defining said lower portion and having a first cross-sectional area, an adjoining second section having a larger cross-sectional area defining a shoulder therebetween, a third section having a cross-sectional area larger than said adjoining section and defining said central portion, and a threaded section of a cross-section less than said third section, wherein said second body portion of said housing is threadedly secured in said threaded section of said first body portion and having a cavity therein defining said upper portion of said chamber and containing said pressure accumulator means, said fluid inlet being in communication with said first section of said chamber, said exhaust port being in communication with said third section of said chamber, and a fluid outlet in said housing in open communication with said first section of said chamber.

10. The valve defined in claim 9, wherein said valve seat defining means comprises a disk-like member having an aperture therein through which said shank portion of said piston-like member extends, said second body portion of said housing being in contact with said disk-like member for maintaining same against said shoulder of said first body portion of said housing, seal means positioned intermediate said disk-like member and said first body portion to prevent fluid leakage therebetween, said disk-like member including a projecting portion forming a seat against which said other of said end portions of said piston-like member abutts creating said fluid seal.

11. The valve defined in claim 10, wherein resilient means is positioned around said shank portion of said piston-like member and intermediate said one end portion of said piston-like member and said disk-like member creating a biasing force on said piston-like member to normally maintain said other end portion of said piston-like member in abutment with said disk-like member.

12. The valve defined in claim 9, wherein said pressure accumulator means comprises a bellows positioned within said second body portion of said housing.

* * * * *